United States Patent
Hoshi et al.

(10) Patent No.: US 8,334,950 B2
(45) Date of Patent: Dec. 18, 2012

(54) ILLUMINATION APPARATUS AND LIQUID CRYSTAL DISPLAY APPARATUS

(75) Inventors: Mitsunari Hoshi, Miyagi (JP); Kei Obata, Miyagi (JP); Akihiro Horii, Miyagi (JP); Noriyuki Hirai, Miyagi (JP); Hiroshi Mizuno, Miyagi (JP); Jun Shimizu, Miyagi (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 12/201,608

(22) Filed: Aug. 29, 2008

(65) Prior Publication Data
US 2009/0059120 A1 Mar. 5, 2009

(30) Foreign Application Priority Data
Aug. 30, 2007 (JP) ................ P2007-223488

(51) Int. Cl.
*G02F 1/1335* (2006.01)
(52) U.S. Cl. ............... 349/96; 349/62; 349/66
(58) Field of Classification Search ........... 349/62, 349/66, 96
See application file for complete search history.

(56) References Cited

U.S. PATENT DOCUMENTS

| | | | | |
|---|---|---|---|---|
| 8,102,485 | B2 * | 1/2012 | Kawakami | ............ 349/64 |
| 2002/0180911 | A1 * | 12/2002 | Iijima | ............ 349/114 |
| 2008/0037283 | A1 * | 2/2008 | Mi et al. | ............ 362/620 |
| 2008/0136997 | A1 * | 6/2008 | Chang et al. | ............ 349/62 |

FOREIGN PATENT DOCUMENTS

| | | |
|---|---|---|
| JP | 11052372 | 2/1999 |
| JP | 2000122046 | 4/2000 |
| JP | 2002-90717 | 3/2002 |
| JP | 2004-046050 | 2/2004 |
| JP | 2006236804 | 9/2006 |
| JP | 02007286573 A * | 11/2007 |

OTHER PUBLICATIONS

Japanese Office Action (2007-223488) issued on Jul. 28, 2009.
Japanese Office Action issued on Mar. 23, 2010, for corresponding Japanese Patent Application JP 2007-223488.

* cited by examiner

*Primary Examiner* — Phu Vu
(74) *Attorney, Agent, or Firm* — K&L Gates LLP (57) ABSTRACT

An illumination apparatus is disclosed. The illumination apparatus includes a polarization plate, a light source, and a light transmission film. The light transmission film is disposed between the polarization plate and the light source and includes a plurality of prisms formed on a surface thereof, the plurality of prisms each having a ridge line in a first direction and being continuously arranged in a second direction perpendicular to the first direction. In the illumination apparatus, the light transmission film is disposed such that a ridge line direction of the plurality of prisms is one of a perpendicular direction and an approximately perpendicular direction to a transmission axis of the polarization plate.

16 Claims, 10 Drawing Sheets

(Case 1)

FIG.3A (Case 2)

Luminance distribution with respect to view angles in Case 2

FIG.6

Polarization dependence
of reflectance on interface P1

FIG.7A

Polarization dependence
of reflectance on interface P2

Luminance distribution with respect to view angles in Case 4

ILLUMINATION APPARATUS AND LIQUID CRYSTAL DISPLAY APPARATUS

CROSS REFERENCES TO RELATED APPLICATIONS

The present application claims priority to Japanese Patent Application JP 2007-223488 filed in the Japanese Patent Office on Aug. 30, 2007, the entire contents of which being incorporated herein by reference.

BACKGROUND

The present application relates to an illumination apparatus including a light transmission film on a surface of which prism structures are continuously arranged, and a liquid crystal display apparatus.

A liquid crystal display (LCD) apparatus can realize lower power consumption and reduction in size and thickness as compared to a cathode ray tube (CRT), and thus is currently widely used for a large-size LCD television, compact apparatuses such as a mobile phone, a digital camera, and a personal digital assistant (PDA), and like other products of various sizes.

The liquid crystal display apparatuses are categorized into, for example, a transmission type and a reflection type. In particular, the transmission-type liquid crystal display apparatus includes a liquid crystal display panel, a light-incident-side polarization plate, a light-exit-side polarization plate, and a backlight unit as an illumination light source. The liquid crystal display panel is formed by sandwiching a liquid crystal layer by a pair of transparent substrates. The light-incident-side polarization plate and the light-exit-side polarization plate are disposed on a light incident side and a light exit side of the liquid crystal display panel, respectively. The backlight units are categorized into a direct type backlight in which the light source is disposed immediately below the liquid crystal display panel and an edge-light type backlight using a light guide panel.

On the other hand, there has been known a structure in which a light transmission film referred to as a prism sheet is disposed between the backlight unit and the liquid crystal display panel in order to distribute outgoing light from the liquid crystal display panel so that the light has a large intensity toward the front. The prism sheet includes a prism portion formed by arranging a plurality of structures, each of which has an approximately triangular cross section and has a ridge line extending in a first direction (ridge line direction), in a second direction (arrangement direction) perpendicular to the first direction. The prism sheet exhibits an operation of improving a front luminance by causing light from the backlight unit to travel toward the front.

Further, Japanese Patent Application Laid-open No. 2002-90717 discloses an edge-light type illumination apparatus including a light guide panel and having a structure in which the prism ridge line direction is parallel or approximately parallel to a transmission axis of a polarization plate disposed on the light incident side of the liquid crystal display panel, and a liquid crystal display apparatus including the edge-light type illumination apparatus. On a light-exit-side surface of the light guide panel, a prism array in which prisms each having a triangular cross section are continuously arranged is formed.

SUMMARY

In recent years, there is a demand for further improvement of a front luminance of a liquid crystal display apparatus. For example, the improvement of the front luminance can realize lower power consumption of backlight sources in a big-screen liquid crystal display for a TV, and can enhance visibility of a mobile, compact liquid crystal display.

As disclosed in Japanese Patent Application Laid-open No. 2002-90717, in a liquid crystal display apparatus including an edge-light type backlight unit, a prism ridge line direction of a prism array formed on a light-exit-side surface of a light guide panel is set so as to be approximately parallel to a transmission axis of a polarization plate disposed on a light incident side of a liquid crystal display panel, to thereby obtain a maximum luminance of a display surface.

However, in an illumination apparatus or a liquid crystal display apparatus having a structure in which a light transmission film like a prism sheet is disposed between the polarization plate and the light sources, an optimal light distribution characteristic is not always obtained in a structure in which the prism ridge line direction of the prism sheet is parallel to the transmission axis of the light-incident-side polarization plate of the panel. In particular, there is a problem in that a sufficient luminance characteristic is difficult to be obtained in accordance with a specification in which the front luminance is demanded to be improved.

It is desirable to provide an illumination apparatus and a liquid crystal display apparatus capable of further improving the front luminance.

According to an embodiment, there is provided an illumination apparatus. The illumination apparatus includes a polarization plate, a light source, and a light transmission film. The light transmission film is disposed between the polarization plate and the light source and includes a plurality of prisms formed on a surface thereof, the plurality of prisms each having a ridge line in a first direction and being continuously arranged in a second direction perpendicular to the first direction. In the illumination apparatus, the light transmission film is disposed such that a ridge line direction of the plurality of prisms is one of a perpendicular direction and an approximately perpendicular direction to a transmission axis of the polarization plate.

Further, according to another embodiment, there is provided a liquid crystal display apparatus. The liquid crystal display apparatus includes a liquid crystal display panel, a light source, and a light transmission film. The liquid crystal display panel includes a light-incident-side polarization plate, a light-exit-side polarization plate, and a liquid crystal cell disposed between the light-incident-side polarization plate and the light-exit-side polarization plate. In the liquid crystal display apparatus, the light transmission film is disposed between the light-incident-side polarization plate and the light source and includes a plurality of prisms formed on a surface thereof, the plurality of prisms each having a ridge line in a first direction and being continuously arranged in a second direction perpendicular to the first direction. The light transmission film is disposed such that a ridge line direction of the plurality of prisms is one of a perpendicular direction and an approximately perpendicular direction to a transmission axis of the light-incident-side polarization plate.

The light emitted from the light sources passes through the prism sheet and enters the light-incident-side polarization plate. The light that exits the prism sheet contains polarized light that oscillates in the prism arrangement direction and polarized light that oscillates in the prism ridge line direction. The former has higher light intensity than the latter. Therefore, by aligning the transmission axis of the light-incident-side polarization plate with the prism arrangement direction, the front luminance of the liquid crystal display panel can be increased.

In an embodiment, the prism refers to a structure having an approximately triangular cross section, but the prism may have a curved top, or a valley portion between the prisms may be curved. In addition, when the light transmission film according to an embodiment is separated into a sheet portion and a prism portion, the sheet portion and the prism portion may be formed of different materials or the same material.

As described above, according to an embodiment, the front luminance can be improved. As a result, the power consumption can be reduced, and the quality of the display image can be improved.

Additional features and advantages are described herein, and will be apparent from the following Detailed Description and the figures.

DETAILED DESCRIPTION

Hereinafter, embodiments of the present application will be described with reference to the drawings.

[First Embodiment]

Figure 1:
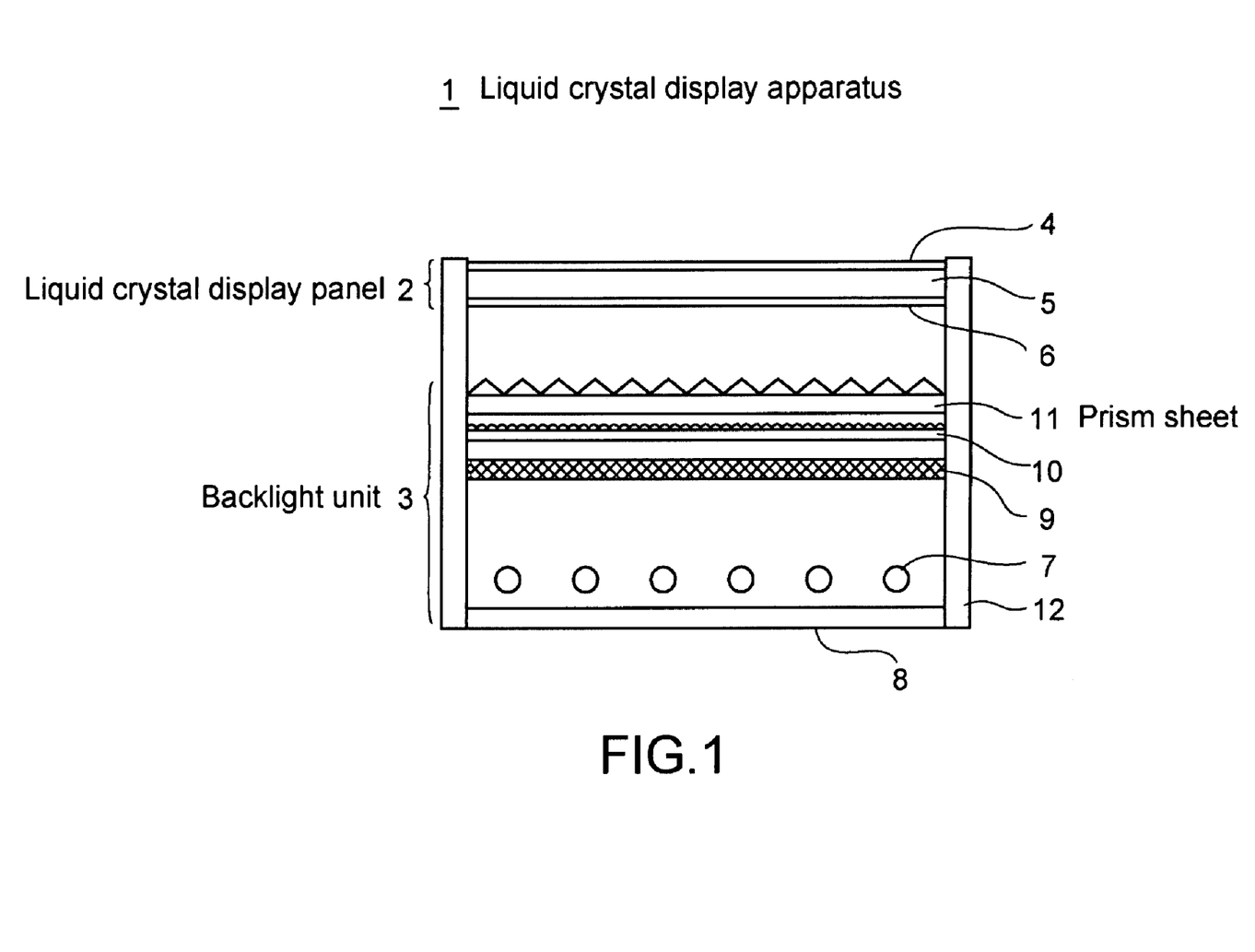
FIG. 1 is a schematic diagram showing a structure of a liquid crystal display apparatus according to a first embodiment.

FIG. 1 is a schematic diagram showing a structure of a liquid crystal display apparatus 1 according to a first embodiment. It is to be noted that FIG. 1 does not necessarily show an actual size or configuration of the liquid crystal display apparatus 1. First, an overall structure of the liquid crystal display apparatus 1 will be described.

The liquid crystal display apparatus 1 in this embodiment includes a liquid crystal display panel 2, a backlight unit 3, a casing 12 for supporting these constituents, and a drive circuit (not shown) for driving the liquid crystal display panel 2 to display an image. A surface (upper surface side of FIG. 1) of the liquid crystal display panel 2 faces an observer side.

(Liquid Crystal Display Panel)

The liquid crystal display panel 2 has a laminated structure constituted of a light-exit-side polarization plate 4, a liquid crystal cell 5, and a light-incident-side polarization plate 6 in the stated order from the observer side. The polarization plates 4 and 6 are a kind of an optical shutter that allows only light (polarized light) in a certain oscillation direction to pass therethrough. In many cases, the polarization plates 4 and 6 are arranged so that their polarization axes (transmission axes) make an angle of 90 degrees with respect to each other. Accordingly, light emitted from light sources is transmitted through a liquid crystal layer or blocked.

The liquid crystal cell 5 includes a transparent substrate, a color filter layer, a transparent electrode layer, an oriented film, the liquid crystal layer, another oriented film, a transparent pixel electrode layer, and another transparent substrate in the stated order from the observer side. The transparent substrate is a substrate transparent for visible light, such as a plate glass. On the transparent substrate on the side of the light sources, a TFT (Thin Film Transistor) as a drive element electrically connected to the transparent pixel electrode layer, and an active matrix drive circuit including wiring or the like are formed. The color filter layer has a structure in which color filter layers for separating the incident light from the light sources into three primary colors of, e.g., red (R), green (G), and blue (B) are arranged. The transparent electrode layer is formed of ITO (Indium Tin Oxide), for example, and functions as a common opposite electrode. The oriented film is formed of a polymer material such as polyimide, and performs orientation processing on a liquid crystal. The liquid crystal layer is formed of a crystal in, e.g., a VA (Vertical Alignment) mode, an IPS (In-Plane Switching) mode, a TN (Twisted Nematic) mode, or an STN (Super Twisted Nematic) mode, and has a function of allowing the light emitted from the light sources to pass therethrough or blocking the emitted light for each pixel by an applied voltage from the drive circuit. The transparent pixel electrode layer is formed of ITO or the like, and functions as an electrode for each pixel.

(Backlight Unit)

The backlight unit 3 includes light sources 7, a reflection sheet 8, a diffusion plate 9, a diffusion sheet 10, and a prism sheet 11 as shown in FIG. 1. In this embodiment, the backlight unit 3 is a direct type, but is not limited to this type and may be an edge-light type that uses a light guide panel. The backlight unit 3 and the light-incident-side polarization plate 6 constitute an "illumination apparatus" according to the embodiment.

For the light sources 7, linear light sources such as a plurality of cold cathode fluorescent lamps (CCFLs), point-like light sources such as a plurality of light emitting diodes (LEDs), or the like are used. The reflection sheet 8 is formed of foamed polyethylene terephthalate (PET), an deposited silver film, a multilayer reflection film, or the like, and reflects light that has been partially reflected on the diffusion plate, the diffusion sheet, the prism sheet, and the like toward the liquid crystal display panel. Thus, the light emitted from the light sources 7 can be efficiently used.

The diffusion plate 9 is an optical sheet whose rigidity is relatively large and which has a light diffusion layer formed by dispersing a light diffusion material (filler) in a relatively thick, plate-like transparent resin or the like. Herein, for the plate-like transparent resin, a light-transmissive thermoplastic resin such as PET, acryl, and polycarbonate, or the like is used. The light diffusion layer included in the diffusion plate has a thickness of 0.5 mm or more and 4 mm or less, for example. Further, the light diffusion materials are, for example, composed of particles having an average particle size of 0.5 μm or more and 10 μm or less, and dispersed in the transparent resin by 0.1 part by weight or more and 10 parts by weight or less with respect to the weight of the entire light diffusion layer. Thus, the diffusion plate has a function of diffusing light from the light sources and uniforming in-plane distribution of luminances.

The diffusion sheet 10 is an optical sheet formed by coating a relatively thin, film-like transparent resin with a transparent resin containing an optical diffusion material. Herein, for the film-like transparent resin, a light-transmissive thermoplastic resin such as PET, acryl, and polycarbonate, or the like is used. For the light diffusion material, for example, ball-like acryl or silicone whose diameter is about several μm is used. Thus, the diffusion sheet has a function of diffusing light from the light sources and improving the luminance toward the front.

The prism sheet 11 corresponds to a "light transmission film" according to the embodiment, and is used as a film for improving the front luminance of the liquid crystal display apparatus 1. The prism sheet 11 is disposed on the light exit side of the diffusion sheet 10 for diffusing light from the light sources and exerts an operation of improving the front luminance and the light extracting efficiency. Hereinafter, the prism sheet 11 will be described in detail.

(Prism Sheet)

Figure 2:
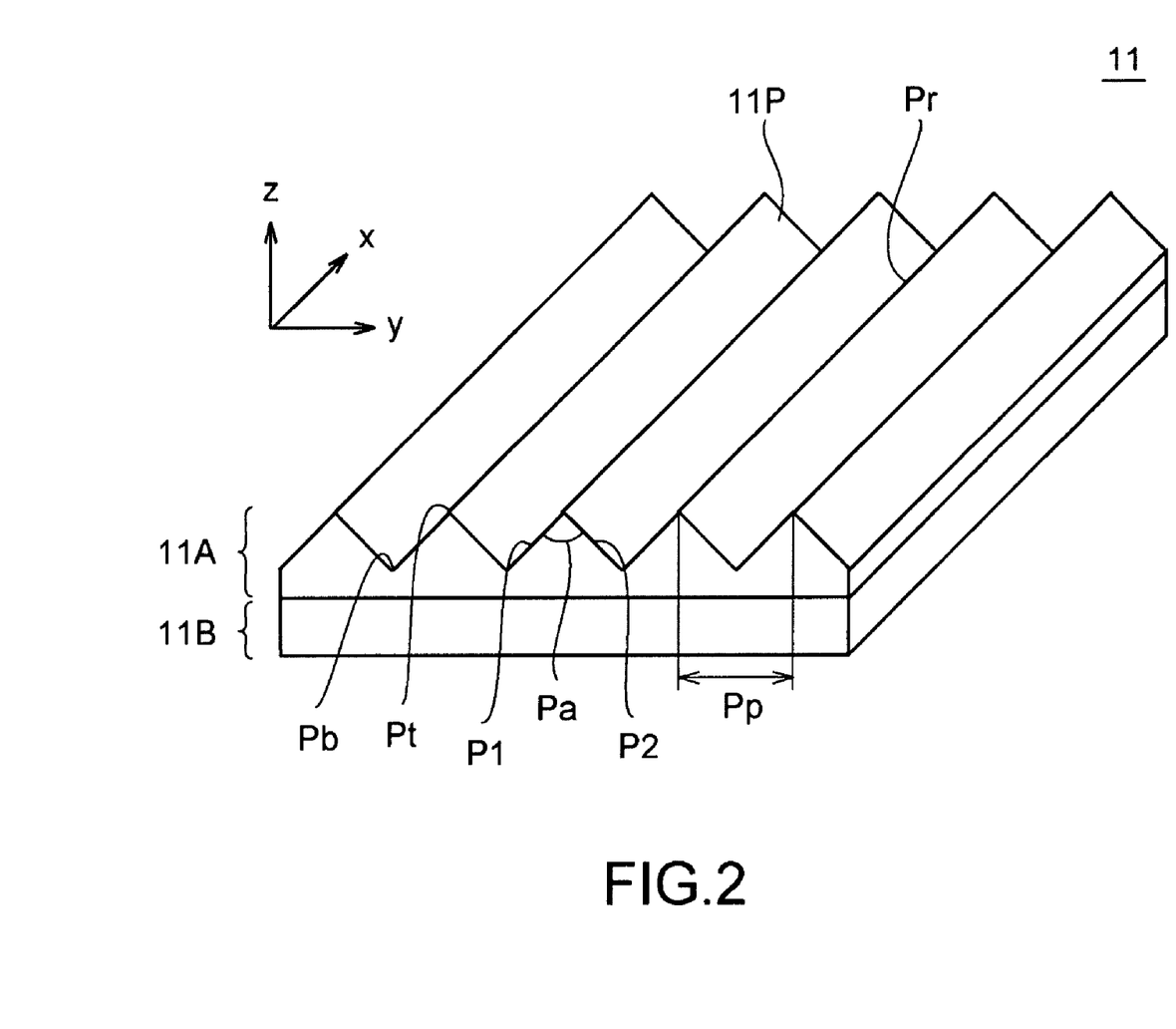
FIG. 2 is a schematic perspective view showing a prism sheet as a light transmission film according to the first embodiment.

FIG. 2 is a schematic perspective view showing a structure of the prism sheet 11. The prism sheet 11 has a structure in which a plurality of prisms 11P each having a ridge line Pr in a first direction (x direction, i.e., ridge line direction) are continuously arranged in a second direction (y direction, i.e., arrangement direction) perpendicular to the first direction. The prism 11P has a three-dimensional structure that protrudes in a thickness direction (z direction) of the prism sheet 11 and has an approximately triangular cross section. In this embodiment, the prism 11P is a rectangular equilateral triangle in cross section, that is, the vertex angle of the cross section is 90 degrees.

Herein, the vertex angle refers to an angle Pa formed by two sides P1 and P2 between a prism top portion Pt and valley portions Pb. Further, the prism is not limited to the three-dimensional structure having the triangular cross section, and may be a three-dimensional structure having a curved top portion Pt. An arrangement pitch (distance between adjacent prism top portions or between adjacent valley portions) of the prisms 11P is not specifically limited, and is several ten to several hundred micrometers, for example. It is to be noted that the prism sheet is not limited to having prisms of the same height, vertex angle, and arrangement pitch, and may have prisms whose configurations are regularly or irregularly changed.

As shown in FIG. 2, the prism sheet 11 is constituted of a prism portion 11A in which the plurality of prisms 11P are formed and a sheet portion 11B for supporting the prism portion 11A. The prism portion 11A and the sheet portion 11B are formed of a light-transmissive resin material. The prism portion 11A and the sheet portion 11B may be formed of the same material or different materials.

Specifically, examples of the materials that form the prisms 11P or the prism sheet 11 include: PET (polyethylene terephthalate); PEN (polyethylene naphthalate); a mixture of the PET and PEN; copolymers such as a PET-PEN copolymer; polycarbonate; polyvinyl alcohol; polyester; polyvinylidene fluoride; polypropylene; polyamide; a methacrylic resin such as polymethylmethacrylate; a polystyrene resin; an acrylonitrile styrene copolymer (AS resin); a methyl methacrylate styrene copolymer; and a mixture thereof. Further, an energy beam-curable resin that is cured by irradiation of electron beams or light such as UV rays or heat rays can be applied.

Figure 3A:
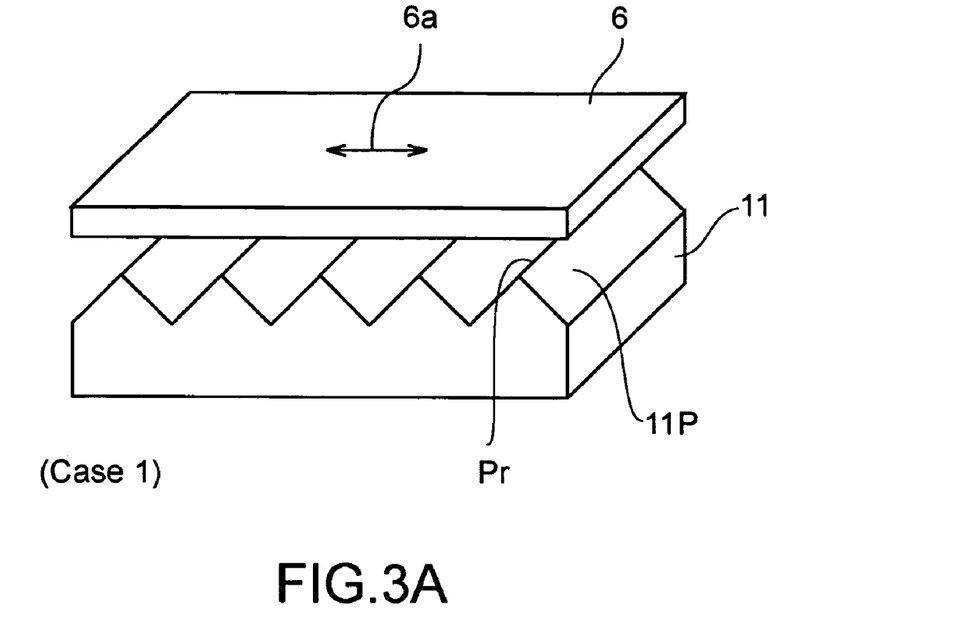
FIGS. 3A and 3B are schematic perspective views each showing a positional relationship between a light-incident-side polarization plate and the prism sheet according to the first embodiment.

The prism sheet 11 is disposed between the light-incident-side polarization plate 6 and the diffusion sheet 10. As shown in FIG. 3A, the prism sheet 11 is disposed such that the ridge line (Pr) direction of the prisms 11P is perpendicular or approximately perpendicular to the transmission axis 6a of the light-incident-side polarization plate 6.

Figure 3B:
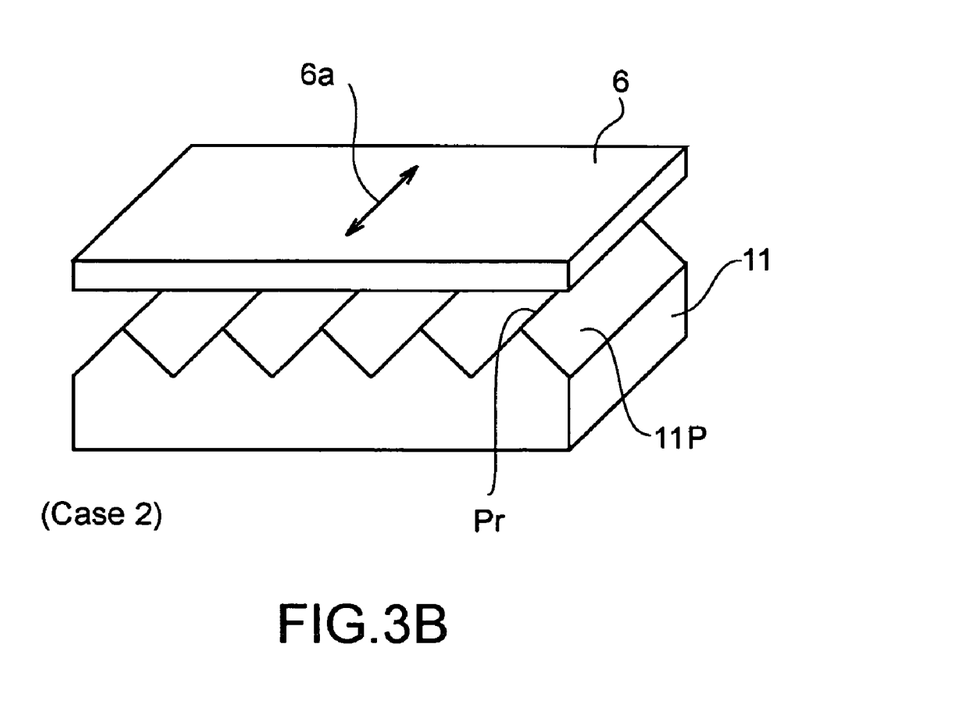
Figure 4:
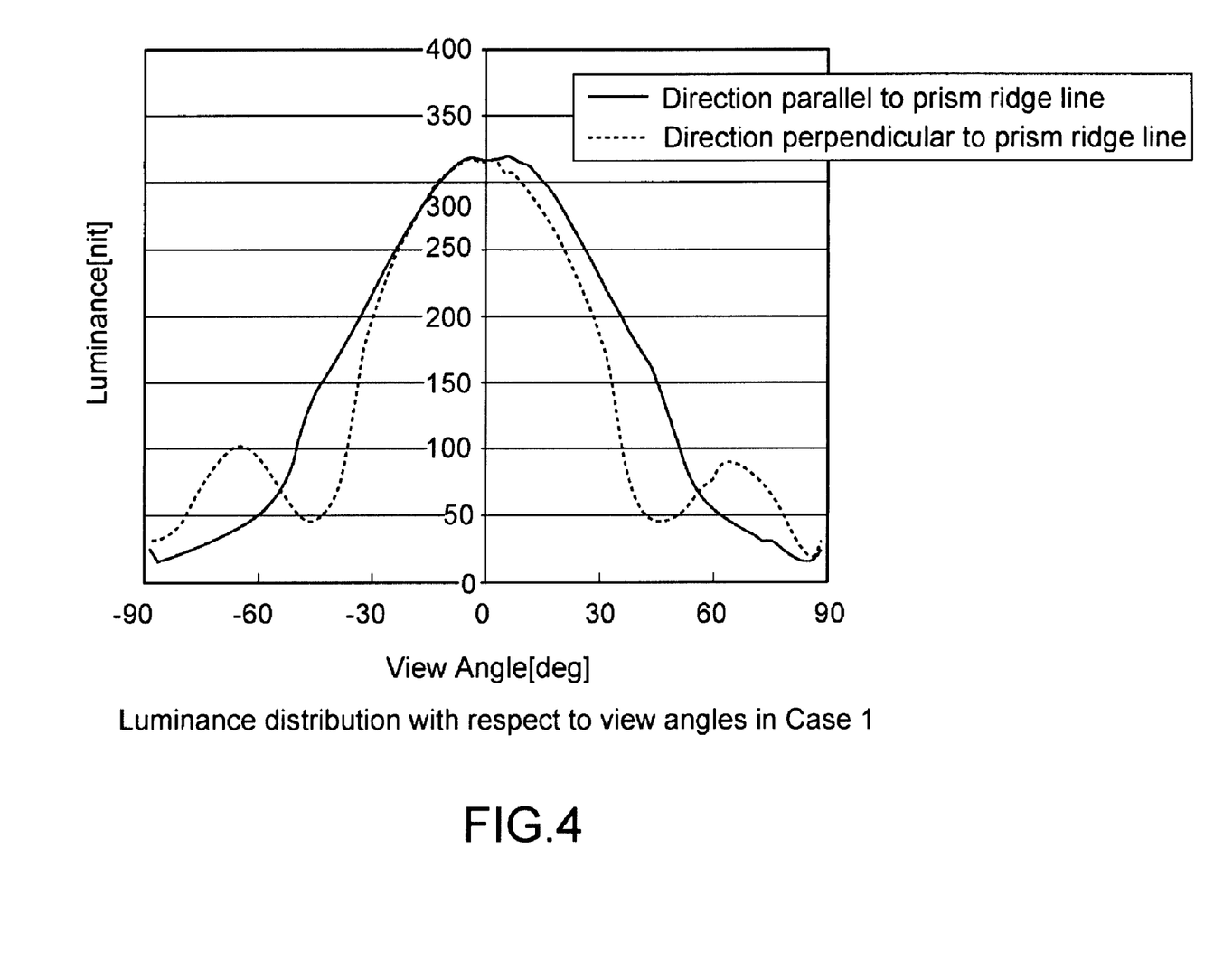
FIG. 4 is a graph showing a measurement result of a luminance distribution with respect to view angles in a case where the prism ridge line direction and a transmission axis of the polarization plate are perpendicular to each other, the measurement result being described in the first embodiment.

FIG. 4 shows a luminance distribution with respect to view angles (measurement values) of the liquid crystal display apparatus in a case where the ridge line direction of the prisms 11P is perpendicular to the transmission axis 6a of the light-incident-side polarization plate 6 (hereinafter, also referred to as "Case 1"). For comparison, FIG. 5 shows a luminance distribution with respect to view angles (measurement values) of the liquid crystal display apparatus in a case where the ridge line direction of the prisms 11P is parallel to the transmission axis 6a of the light-incident-side polarization plate 6 (hereinafter, also referred to as "Case 2") as shown in FIG. 3B.

A measurement condition in Case 1 differs from that in Case 2 only in the positional relationship between the polarization plate 6 and the prism sheet 11. The structures of, e.g., the optical sheet and the light sources to be used are identical in Cases 1 and 2. It is to be noted that "BEF III" (product name) manufactured by 3M is used as a luminance enhancement film for the prism sheet 11.

Figure 5:
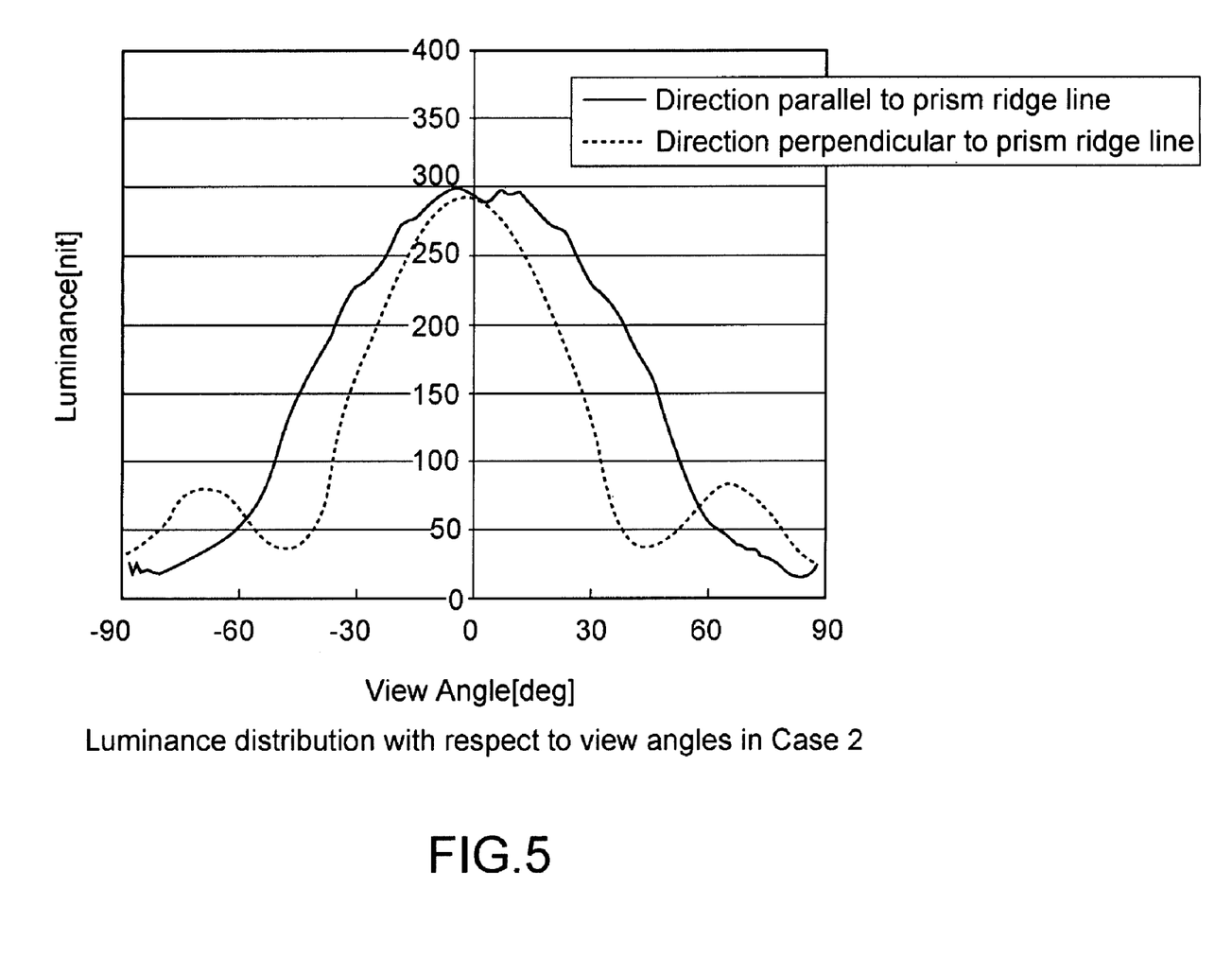
FIG. 5 is a graph showing a measurement result of a luminance distribution with respect to view angles in a case where the prism ridge line direction and the transmission axis of the polarization plate are parallel to each other, the measurement result being described in the first embodiment.

FIGS. 4 and 5 each show the luminance distribution with respect to view angles when all-white image data is displayed on the liquid crystal display panel. Further, Table 1 shows a comparison between the front luminances and illuminances in Cases 1 and 2. Herein, the luminance distribution with respect to view angles refers to a luminance distribution when the liquid crystal display apparatus is viewed obliquely. The front luminance refers to a luminance when the prism sheet 11 is viewed from the perpendicular direction. In addition, the illuminance refers to light fluxes per unit area which are emitted from the liquid crystal display apparatus, and serves as a use efficiency indicator that indicates an extent to which the light fluxes emitted from the light sources have been used.

TABLE 1

|  | Case 1 | Case 2 |
|---|---|---|
| Front luminance[cd/m$^2$] | 322 | 298 |
| Illuminance[lm/m$^2$] | 399 | 362 |

As shown in FIGS. 4 and 5 and Table 1, the front luminance in Case 1 is higher than that in Case 2 by about 8%. Also, the illuminance (use efficiency) in Case 1 is higher than that in Case 2 by about 10%.

Next, reasons why the front luminance in Case 1 is higher than that in Case 2 will be described with reference to FIGS. 6 and 7.

Figure 6:
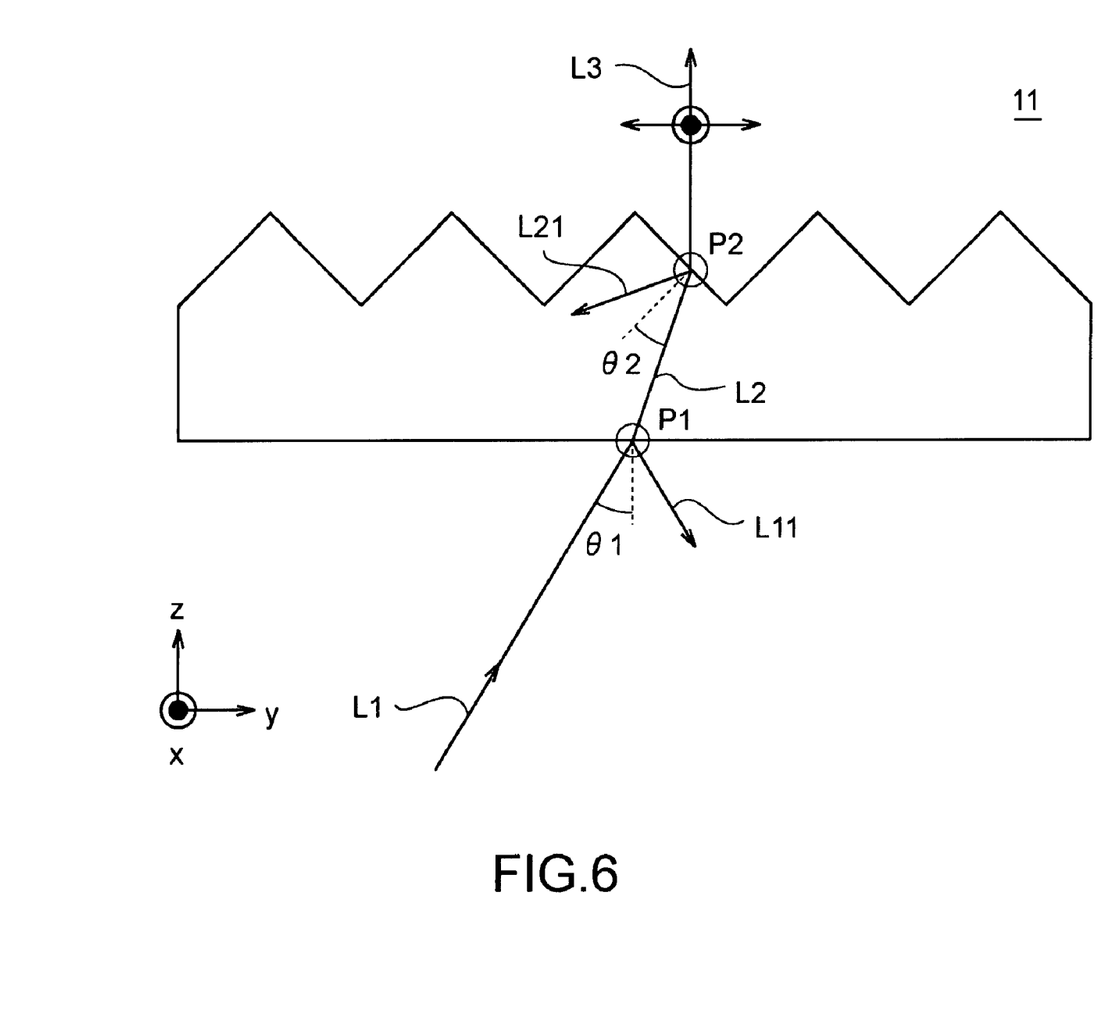
FIG. 6 is a schematic diagram illustrating refraction and transmission of light with respect to the prism sheet.

FIG. 6 is a schematic diagram showing an optical path of light that passes through the prism sheet 11. The light emitted toward the front surface of the prism sheet 11 is refracted mainly on an interface P1 between air and the bottom of the prism sheet and an interface P2 between air and the prism portion. Generally, incident light L1 to the prism sheet 11 passes through the diffusion plate 9 and the diffusion sheet 10 (FIG. 1), so the incident light L1 is non-polarized light. The incident light L1 diverges on the interface P1 into reflection light L11 and transmission light L2. Then, the transmission light L2 diverges on the interface P2 into reflection light L21 and exit light L3.

Herein, reflectance of light on each of the interfaces P1 and P2 changes depending on whether the incident light is S-polarized light or P-polarized light. FIGS. 7A and 7B each show a polarization dependence of the reflectance on the interfaces P1 and P2 of the prism sheet. In this example, S-polarized light refers to light that oscillates in the prism ridge line direction, while P-polarized light refers to light that oscillates in the prism arrangement direction. The abscissa axes shown in FIGS. 7A and 7B respectively indicate light incident angles θ1 and θ2 with respect to the interfaces P1 and P2. In a case where the refractive index of the prism sheet is 1.61, θ1 is about 32 degrees and θ2 is about 26 degrees.

Figure 7A:
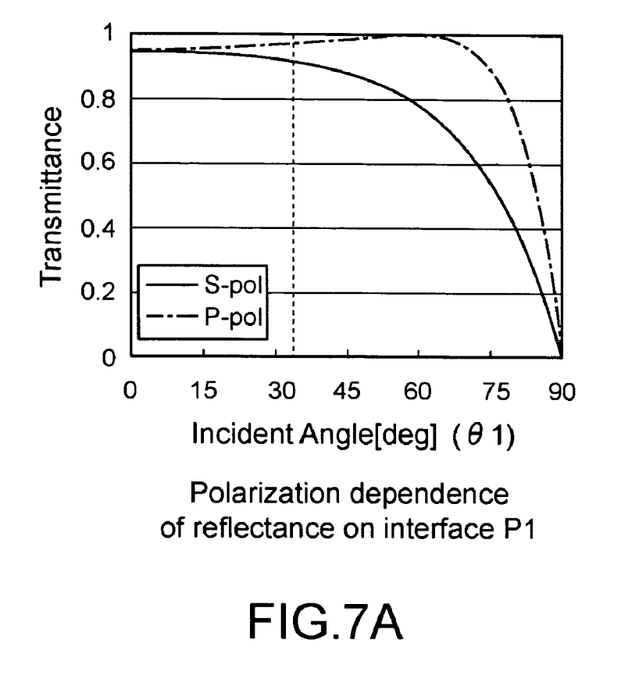
FIGS. 7A and 7B are graphs each showing a difference of transmission characteristics between P-polarized light and S-polarized light with respect to the prism sheet.
Figure 7B:
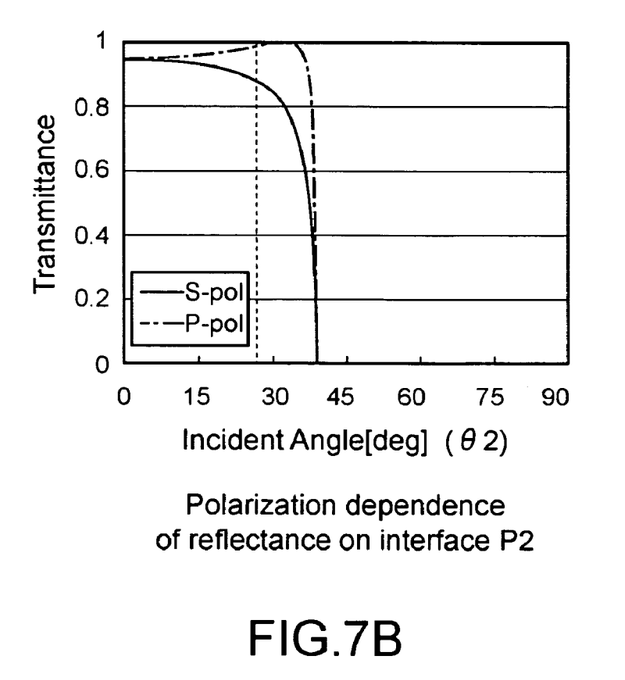

As seen from FIGS. 7A and 7B, a transmittance of the P-polarized light is larger than that of the S-polarized light on the interfaces in any situation. Therefore, the amount of the P-polarized light is larger than that of the S-polarized light in the exit light L3 toward the front surface of the prism sheet 11. The P-polarized light travels in a direction corresponding to the prism arrangement direction of the prism sheet 11. Therefore, when the transmission axis of the light-incident-side polarization plate 6 is set to be parallel to the prism arrangement direction, the amount of light that passes through the polarization plate is increased, resulting in increase of the front luminance.

It is to be noted that in a case where the prism sheet has principal refractive indexes in the prism ridge line direction (x direction) and the prism arrangement direction (y direction), that is, has refractive index anisotropy, as well as a case where the prism sheet has refractive index isotropy, the prism sheet is affected by both the interfaces P1 and P2 as described above, resulting in increase of the front luminance.

On the other hand, when the prism sheet is formed of a material such as PET, since PET has slight anisotropy, a refraction axis (optical axis) thereof is not often controlled, and the prism sheet generally has a thickness of several ten to several hundred micrometers, the light that passes through the prism sheet is largely retarded and the polarization light is not maintained in some cases. In this case, the interface P2 rather than the interface P1 dominantly exerts an influence. Thus, in the above-described Cases 1 and 2 in which "BEF III" (product name) is used for the prism sheet, the interface P2 intensely exerts the influence.

As described above, according to this embodiment, the prism sheet 11 is disposed such that the ridge line direction of the prisms 11P is perpendicular or approximately perpendicular to the transmission axis 6a of the light-incident-side polarization plate 6, with the result that the front luminance and the illuminance (use efficiency) can be further improved as compared to the case where the prism sheet 11 is disposed such that the ridge line direction of the prisms 11P is parallel to the transmission axis 6a of the light-incident-side polarization plate 6.

[Second Embodiment]

Figure 8:
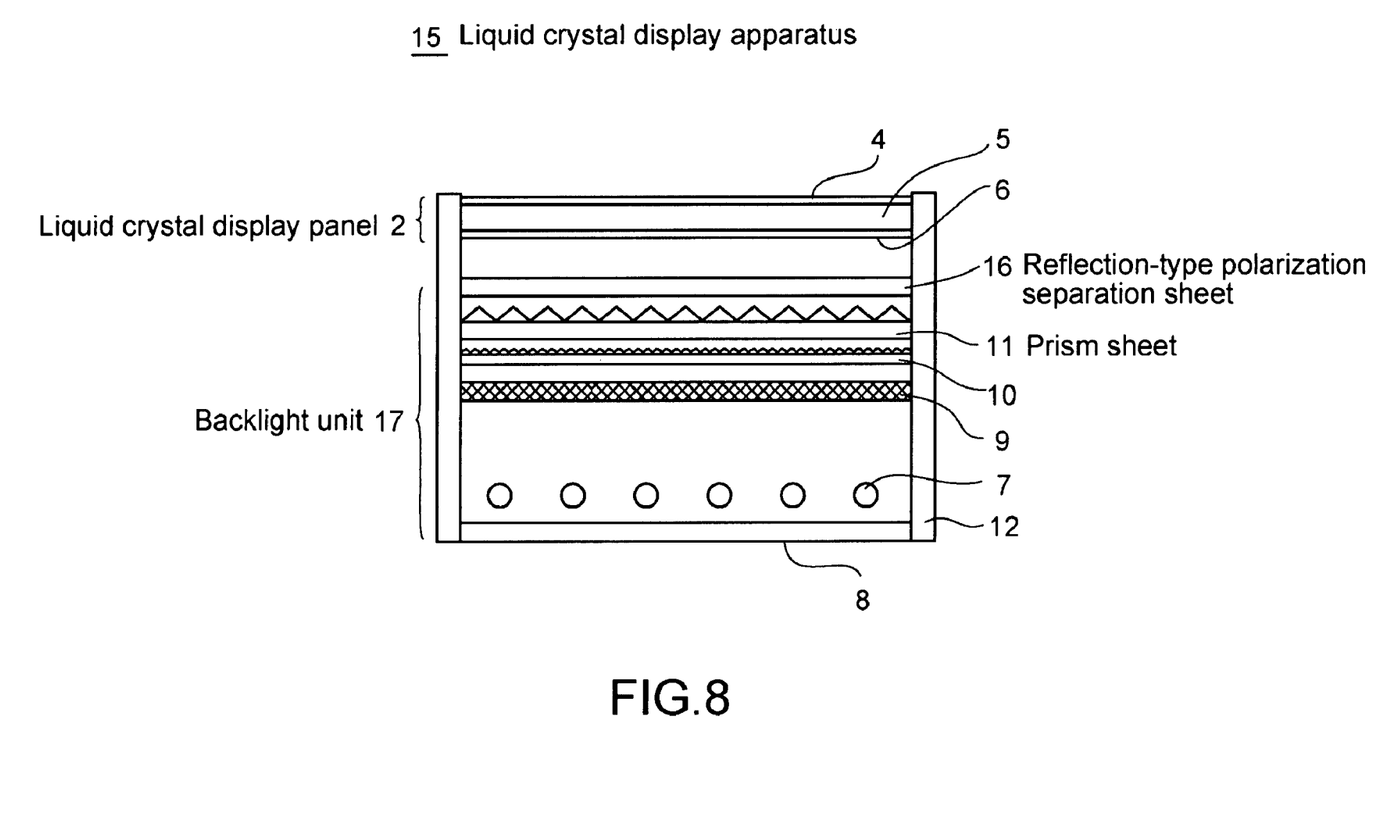
FIG. 8 is a schematic diagram showing a structure of a liquid crystal display apparatus according to a second embodiment.

FIG. 8 is a schematic diagram showing a structure of a liquid crystal display apparatus 15 according to a second embodiment. It is to be noted that an actual size and configuration of the liquid crystal display apparatus 15 is not necessarily shown because FIG. 8 is merely a schematic diagram. Further, in the figure, constituents corresponding to those of the first embodiment described above are denoted by the same reference numerals, and detailed description thereof is omitted.

The liquid crystal display apparatus 15 of this embodiment has the same structure as the liquid crystal display apparatus 1 of the first embodiment, except that the liquid crystal display apparatus 15 includes a reflection-type polarization separation sheet 16 disposed between the liquid crystal display panel 2 and the prism sheet 11. In this embodiment, the light sources 7, the reflection sheet 8, the diffusion plate 9, the diffusion sheet 10, the prism sheet 11, and the reflection-type polarization separation sheet 16 constitute a backlight unit 17. The backlight unit 17 and the light-incident-side polarization plate 6 constitute an "illumination apparatus" according to the embodiment.

The reflection-type polarization separation sheet 16 has a multilayer structure in which layers having different refractive indexes are alternately laminated. In addition, the reflection-type polarization separation sheet 16 performs polarization separation on light having directivity increased by the prism sheet 11, and selectively reflects polarized light in a direction of an absorption axis of the light-incident-side polarization plate 6 of the liquid crystal display panel 2. The reflected light is reflected again by the reflection sheet 8 in the illumination apparatus. At this time, the light is depolarized, so the light reflected by the reflection-type polarization separation sheet 16 can be reused. As the reflection-type polarization separation sheet, "DBEF" (product name) manufactured by 3M can be employed.

Figure 9:
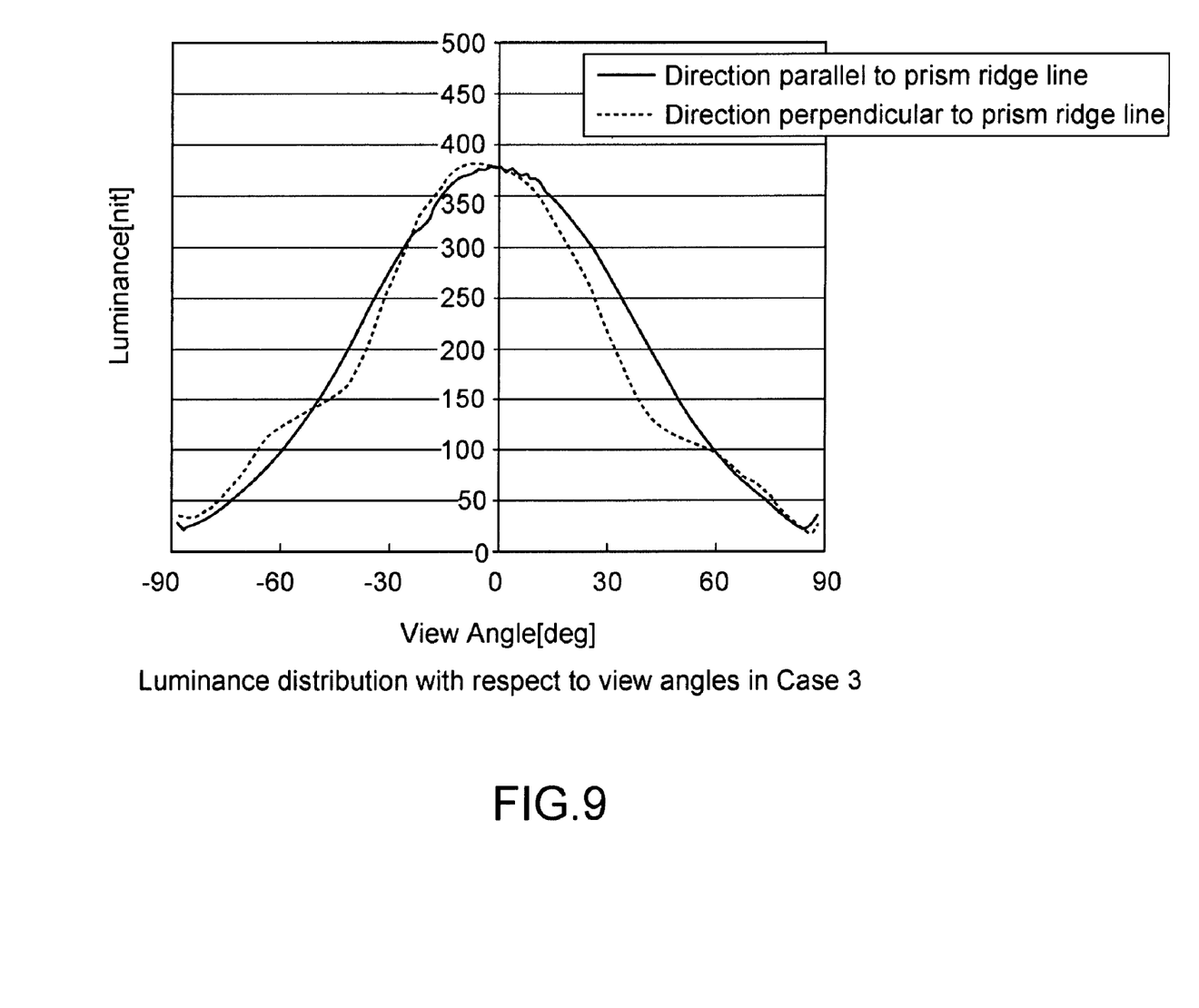
FIG. 9 is a graph showing a measurement result of a luminance distribution with respect to view angles in a case where the prism ridge line direction and a transmission axis of the polarization plate are perpendicular to each other, the measurement result being described in the second embodiment.

FIG. 9 shows a luminance distribution with respect to view angles (measurement values) of the liquid crystal display apparatus in a case where the ridge line direction of the prisms 11P is perpendicular to the transmission axis of the light-incident-side polarization plate 6 (hereinafter, also referred to as "Case 3"). For comparison, FIG. 10 shows a luminance distribution with respect to view angles (measurement values) of the liquid crystal display apparatus in a case where the ridge line direction of the prisms 11P is parallel to the transmission axis of the light-incident-side polarization plate 6 (hereinafter, also referred to as "Case 4").

A measurement condition in Case 3 differs from that in Case 4 only in the positional relationship between the polarization plate 6 and the prism sheet 11. The structures of, e.g., the optical sheet and the light sources to be used are identical in Cases 3 and 4. In both cases, the transmission axis of the reflection-type polarization separation sheet 16 is set to be perpendicular to the ridge line Pr of the prisms 11P of the prism sheet 11 (i.e., parallel to the arrangement direction of the prisms 11P). It is to be noted that "DBEF-D440" (product name) manufactured by 3M is used for the reflection-type polarization separation sheet 16.

Figure 10:
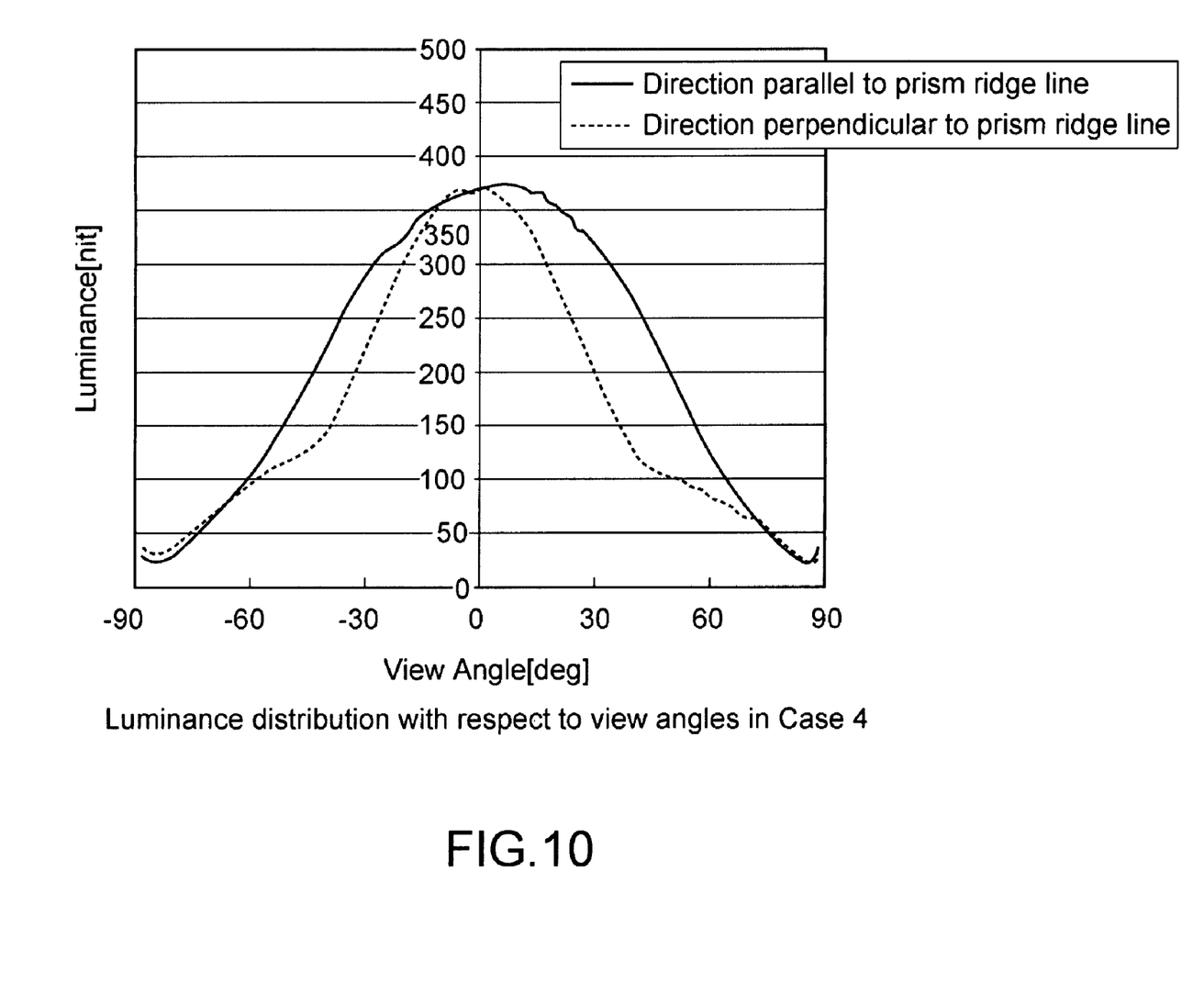
FIG. 10 is a graph showing a measurement result of a luminance distribution with respect to view angles in a case where the prism ridge line direction and the transmission axis of the polarization plate are parallel to each other, the measurement result being described in the second embodiment.

FIGS. 9 and 10 each show the luminance distribution with respect to the view angles when all-white image data is displayed on the liquid crystal display panel. Further, Table 2 shows a comparison of the front luminances and illuminances between Cases 3 and 4. Herein, the luminance distribution with respect to view angles refers to a luminance distribution when the liquid crystal display apparatus is viewed obliquely. The front luminance refers to a luminance when the prism sheet 11 is viewed from the perpendicular direction. In addition, the illuminance refers to light fluxes per unit area which are emitted from the liquid crystal display apparatus, and serves as a use efficiency indicator that indicates an extent to which the light fluxes emitted from the light sources have been used.

TABLE 2

|  | Case 3 | Case 4 |
| --- | --- | --- |
| Front luminance[cd/m$^2$] | 411 | 398 |
| Illuminance[lm/m$^2$] | 601 | 589 |

As shown in FIGS. 9 and 10 and Table 2, the front luminance in Case 3 is higher than that in Case 4 by about 3%. Also, the illuminance (use efficiency) in Case 3 is higher than that in Case 4 by about 2%.

In both Cases 3 and 4, the front luminances and the illuminances are increased as compared to Cases 1 and 2. This results from the operation of the reflection-type polarization separation sheet 16. The reason why the front luminance is increased is the same as the case of the first embodiment (Case 1). However, rates of increases of the luminance and the illuminance in Case 3 with respect to Case 4 are lower than those in the cases of the first embodiment (that is, rates of increases of the luminance and the illuminance in Case 1 with respect to Case 2). This may be because the "DBEF-D440" used as the reflection-type polarization separation sheet has a slight haze, resulting in diffusion of light in the front direction of the prism sheet.

It should be appreciated that the present application is not limited to the embodiments as previously described. For example, in the first and second embodiments, the structures shown in FIGS. 1 and 9 are described as the liquid crystal display apparatuses 1 and 15, respectively, but the structures are not limited thereto. That is, the various kinds of optical sheets (the diffusion plate 9 and the diffusion sheet 10) disposed between the light sources 7 and the prism sheet 11 are not limited to the examples shown in the figures, and a layout thereof can be changed.

Further, in the first and second embodiments, the structure in which only one prism sheet 11 is used is described, but the number of the prism sheets is not limited to one. Two prism sheets may be disposed so that the prism ridge lines of the two prism sheets are perpendicular to each other. In this case, the prism ridge line direction of the prism sheet closer to the light-incident-side polarization plate is set to be perpendicular or approximately perpendicular to the transmission axis of the polarization plate. As a result, the degree of light collection in the front direction is increased, which can further improve the front luminance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An illumination apparatus, comprising:
    a polarization plate;
    a light source;
    a diffusion sheet;
    a reflection-type polarization separation element; and
    a light transmission film that is disposed between the polarization plate and the diffusion sheet and includes a plurality of prisms formed on a surface thereof, the plurality of prisms each having a ridge line in a first direction and being continuously arranged in a second direction perpendicular to the first direction,
    wherein the light transmission film is disposed such that a ridge line direction of the plurality of prisms is one of a perpendicular direction and an approximately perpendicular direction to a transmission axis of the polarization plate,
    wherein the ridge line direction is parallel to an edge of the illumination apparatus,
    wherein the reflection-type polarization separation element is disposed between the polarization plate and the light transmission film and is configured to transmit a first linear polarization component and reflect a second linear polarization component,
    wherein the light transmission film is disposed such that the ridge line direction of the plurality of prisms is one of a perpendicular direction and an a approximately perpendicular direction to a transmission axis of the reflection-type polarization separation element, and
    wherein the reflection-type polarization separation element has a multilayer structure in which layers having different refractive indexes are alternately laminated.

2. The illumination apparatus according to claim 1, wherein the plurality of prisms each have one of a triangular cross section and a triangular cross section having a curved apex.

3. A liquid crystal display apparatus, comprising:
    a liquid crystal display panel including a light-incident-side polarization plate, a light-exit-side polarization plate, and a liquid crystal cell disposed between the light-incident-side polarization plate and the light-exit-side polarization plate;
    a light source;
    a diffusion sheet;
    a reflection-type polarization separation element; and
    a light transmission film that is disposed between the light-incident-side polarization plate and the diffusion sheet and includes a plurality of prisms formed on a surface thereof, the plurality of prisms each having a ridge line in a first direction and being continuously arranged in a second direction perpendicular to the first direction,
    wherein the light transmission film is disposed such that a ridge line direction of the plurality of prisms is one of a perpendicular direction and an approximately perpendicular direction to a transmission axis of the light-incident-side polarization plate, and
    wherein the ridge line direction is parallel to an edge of the liquid crystal display panel
    wherein the reflection-type polarization separation element is disposed between the polarization plate and the light transmission film and is configured to transmit a first linear polarization component and reflect a second linear polarization component,
    wherein the light transmission film is disposed such that the ridge line direction of the plurality of prisms is one of a perpendicular direction and an approximately perendicular direction to a transmission axis of the reflection-type polarization separation element, and
    wherein the reflection-type polarization separation element has a multilayer structure in which layers having different refractive indexes are alternately laminated.

4. The illumination apparatus according to claim 1, wherein the light transmission film is a prism sheet.

5. The liquid crystal display apparatus according to claim 3, wherein the light transmission film is a prism sheet.

6. The liquid crystal display apparatus according to claim 3, wherein the liquid crystal cell includes a first transparent substrate, a color filter layer, a transparent electrode layer, a first oriented film, a liquid crystal layer, a second oriented film, a transparent pixel electrode layer and a second transparent substrate.

7. The liquid crystal display apparatus according to claim 6, wherein the color filter layer has a structure in which color filter layer portions are arranged for separating incident light from the light source into three primary colors of red (R), green (G), and blue (B).

8. The illumination apparatus according to claim 1, further comprising a backlight unit including the light source, a reflection sheet formed below the light source, a diffusion plate, the diffusion sheet, and a prism sheet as the light transmission film.

9. The illumination apparatus according to claim 8, wherein the backlight unit is a direct type backlight unit.

10. The illumination apparatus according to claim 9, wherein the light source is selected from the group consisting of linear light sources including a plurality of cold cathode fluorescent lamps (CCFLs), and point-like light sources including a plurality of light emitting diodes (LEDs).

11. The illumination apparatus according to claim 8, wherein the reflection sheet is selected from the group consisting of a foamed polyethylene terephthalate (PET) layer, a silver film, and a multilayer reflection film.

12. The illumination apparatus according to claim 8, wherein the diffusion plate is an optical sheet having a light diffusion layer formed by dispersing a light diffusion filler material in a material selected from the group consisting of a plate-like transparent resin, and a light-transmissive thermoplastic resin such as PET, acryl, and polycarbonate.

13. The illumination apparatus according to claim 12, wherein the light diffusion filler material is composed of particles having an average particle size of 0.5 μm or more and 10 μm or less, and dispersed in the transparent resin by 0.1 part by weight or more and 10 parts by weight or less with respect to the weight of the entire light diffusion layer.

14. The illumination apparatus according to claim 1, wherein the plurality of prisms include prisms having at least one of a different height, vertex angle, and arrangement pitch configuration, and wherein the configuration of the plurality of prisms are regularly or irregularly changed.

15. The illumination apparatus according to claim 1, wherein the reflection-type polarization separation element selectively reflects polarized light in a direction of an absorption axis of the polarization plate.

16. The illumination apparatus according to claim 1, further comprising a second light transmission film disposed above the first light transmission film, the second light transmission film including a plurality of prisms formed on a surface thereof, the plurality of prisms each having a ridge line in the second direction and being continuously arranged in the first direction perpendicular to the second direction.

* * * * *